United States Patent
Hazelton et al.

(10) Patent No.: US 7,323,835 B2
(45) Date of Patent: Jan. 29, 2008

(54) BRUSHLESS DC MOTOR ACTUATOR HAVING REMOTE COMMUTATION SENSING APPARATUS

(75) Inventors: Lawrence Dean Hazelton, Goodrich, MI (US); David M. Skrzela, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/414,825

(22) Filed: May 1, 2006

(65) Prior Publication Data

US 2007/0252541 A1    Nov. 1, 2007

(51) Int. Cl.
*H02P 1/18* (2006.01)

(52) U.S. Cl. .................. 318/254; 318/138; 318/439; 310/68 B

(58) Field of Classification Search .......... 318/254, 318/138, 439; 310/68 B
See application file for complete search history.

(56) References Cited

U.S. PATENT DOCUMENTS

| | | | |
|---|---|---|---|
| 4,934,041 A | | 6/1990 | Hoover et al. |
| 5,107,159 A | * | 4/1992 | Kordik ................ 310/156.44 |
| 5,237,272 A | | 8/1993 | Murata et al. |
| 5,600,192 A | * | 2/1997 | Carson et al. ............ 310/68 B |
| 6,016,055 A | | 1/2000 | Jager et al. |
| 6,097,129 A | | 8/2000 | Furtwangler et al. |
| 6,320,288 B1 | * | 11/2001 | Suzuki et al. ............ 310/68 B |
| 6,707,183 B2 | | 3/2004 | Breynaert et al. |
| 6,998,741 B2 | | 2/2006 | Breynaert et al. |

* cited by examiner

*Primary Examiner*—Rina Duda
(74) *Attorney, Agent, or Firm*—Paul L. Marshall

(57) ABSTRACT

A brushless DC motor and Hall Effect commutation sensors are mounted on a common circuit board, and ferromagnetic elements partially embedded in the motor stator in proximity to the periphery of the rotor magnetically couple the rotor magnet to the Hall Effect sensors. Preferably, the ferromagnetic elements are embedded in the stator adjacent the radial periphery of the rotor magnet. Alternately, the ferromagnetic elements can be embedded in the stator adjacent the axial periphery of the rotor magnet.

5 Claims, 3 Drawing Sheets

BRUSHLESS DC MOTOR ACTUATOR HAVING REMOTE COMMUTATION SENSING APPARATUS

FIELD OF THE INVENTION

The present invention relates to a brushless DC motor actuator, and more particularly to a commutation sensing apparatus for remotely sensing magnetic fields created by a permanent magnet rotor of the motor.

BACKGROUND OF THE INVENTION

In general, brushless DC motors (also known as electronically commutated motors) include a multi-pole permanent magnet rotor, a multi-pole wound stator and commutation circuitry for selectively activating the stator phase windings to produce motor torque of a desired direction. Since correct activation and commutation of the stator phase windings requires that the orientation of the rotor magnet relative to the stator poles be known, the commutation circuitry must include one or more commutation sensors. Most commonly, commutation sensing is achieved with an array of Hall Effect sensors responsive to magnetic field domains produced by the rotor magnet. See, for example, the U.S. Pat. No. 4,934,041 to Hoover et al. and the U.S. Pat. No. 6,097,129 to Furtwängler et al., which disclose fixturing arrangements for positioning Hall Effect sensors in close proximity to the rotor magnet.

The rotor magnet field domains can be more reliably sensed by embedding Hall Effect sensors in the stator as described herein in respect to the prior art rotary actuator of FIG. 1. However, it is desired to avoid manufacturing costs associated with discrete Hall Effect sensors and interconnection of embedded Hall Effect sensors with the rest of the commutation circuitry. Accordingly, what is needed is an improved commutation sensing apparatus that is both reliable and cost-effective.

SUMMARY OF THE INVENTION

The present invention is directed to a brushless motor actuator having an improved commutation sensing apparatus. The motor and a set of Hall Effect sensors are mounted on a circuit board and ferromagnetic elements partially embedded in the stator in proximity to the periphery of the rotor magnetically couple the rotor magnet to the circuit board mounted Hall Effect sensors. In a first embodiment, the ferromagnetic elements are embedded in the stator adjacent the radial periphery of the rotor magnet. In a second embodiment, the ferromagnetic elements are embedded in the stator adjacent the axial periphery of the rotor magnet.

DESCRIPTION OF THE PREFERRED EMBODIMENT

Figure 1:
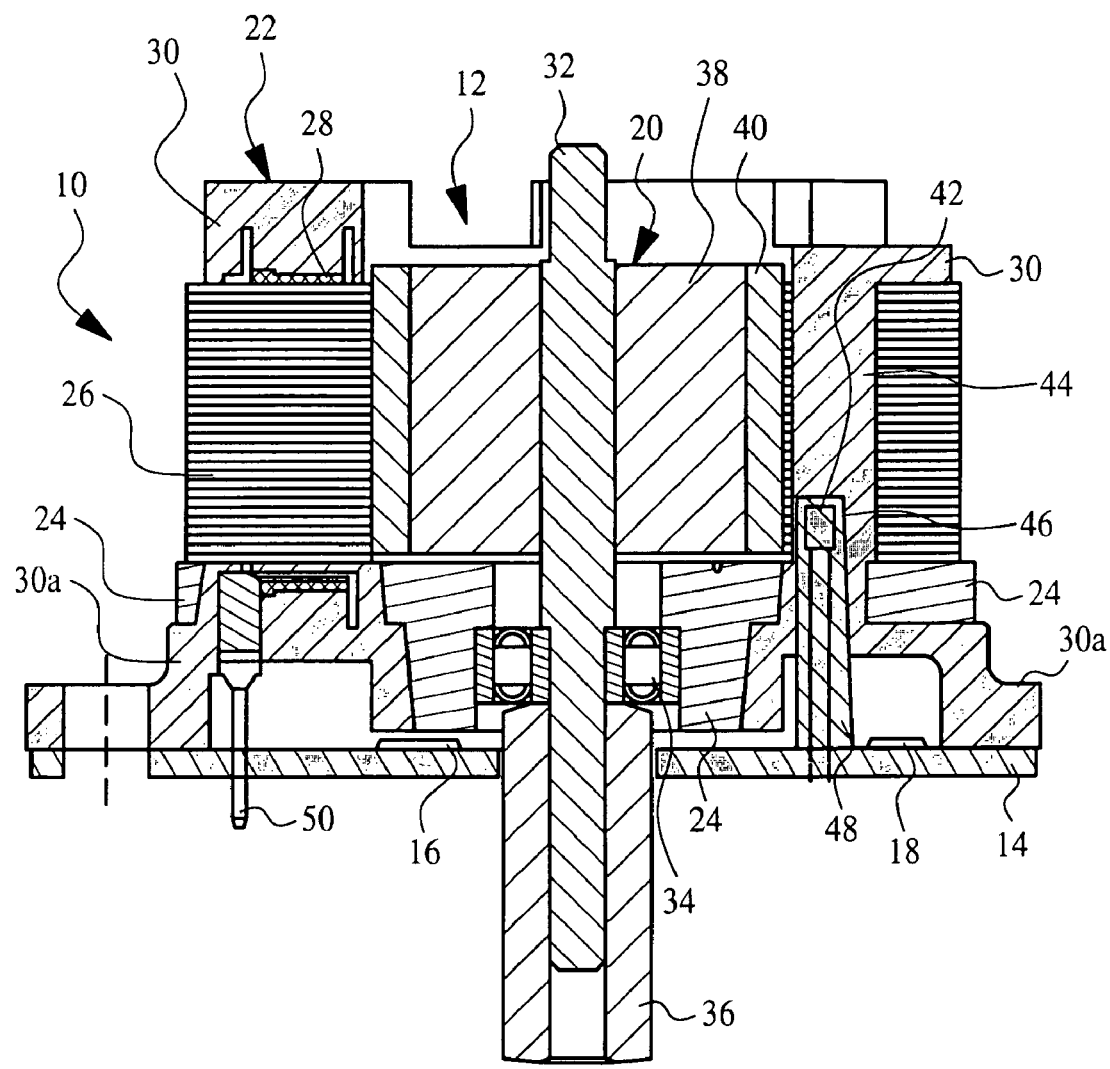
FIG. 1 is a diagram of a prior art rotary actuator comprising a brushless DC motor with embedded Hall Effect sensors.

Referring to FIG. 1, the reference numeral 10 generally designates a prior art rotary actuator that has been manufactured and sold by Delphi Automotive Systems. The actuator 10 includes a brushless DC motor 12 mounted on a printed circuit board 14, and commutation circuit elements 16, 18 for operating the motor 12 to achieve a commanded actuator function. The motor 12 includes a rotor 20 supported for rotation within a wound stator 22. The stator 22 comprises an aluminum base 24, an annular multi-pole laminated core 26 supported on the base 24, and a set of phase windings 28 (only one of which is shown in FIG. 1) wound around the poles of core 26. The base 24, core 26 and phase windings 28 are selectively over-molded with plastic 30 as shown to protect the windings 28 and provide a flange 30a for mounting the motor 12 on printed circuit board 14. The aluminum base 24 and over-molded plastic 30 together form a non-magnetic housing for the core 26.

The rotor 20 includes an axial shaft 32 that extends through the stator 22. The shaft 32 is rotatably supported within stator 22 by a bearing 34 secured in the aluminum base 24. The end of shaft 32 adjacent the aluminum base 24 is fitted with a coupling device such as the pinion gear 36 for activating an external load (not shown), while the other end of shaft 32 is rotatably supported by an external bearing (also not shown). The portion of shaft 32 that lies within the stator core 26 is fitted with an armature 38 including an annular multi-pole permanent magnet 40 at its radial periphery.

Proper activation and commutation of the stator phase windings 28 requires knowledge of the rotational orientation of the rotor 20 relative to the poles of stator core 26. This is commonly achieved with a set of Hall Effect sensors radially distributed around the periphery of the permanent magnet 40. In FIG. 1, the Hall Effect sensors 42 (only one of which is visible in the illustrated cross-section) are positioned adjacent the radial periphery of permanent magnet 40. To this end, the inner periphery of the stator core 26 is undercut at certain radially distributed locations to form plastic-filled regions 44 with axial recesses 46 for receiving the Hall Effect sensors 42. Each Hall Effect sensor 42 is encased in a plastic riser 48 (preferably joined in an annular ring) mounted on the circuit board 14. When the motor 12 is mounted on the circuit board 14, the plastic risers extend into the respective recesses 46 of stator 22 as shown. Alternatively, the Hall Effect sensors 42 may be positioned adjacent the axial periphery of the rotor permanent magnet 40 as shown for example in the aforementioned U.S. Pat. No. 6,097,129 to Furtwängler et al. In either case, the signals produced by Hall Effect sensors 42 are provided as inputs to a motor controller IC 18, and the motor controller IC 18 signals a driver IC 16 to supply direct current from an external source to the appropriate stator phase winding(s) 28 via winding terminals 50.

As indicated above, embedding the commutation sensors 42 in the stator 22 permits the rotor magnet field domains to be sensed more reliably than is possible with pedestal-mounted sensors. However, the part and manufacturing costs associated with using and attaching leaded Hall Effect sensors should be avoided if possible to minimized the actuator cost without degrading its reliability. The present invention accomplishes this objective with ferromagnetic elements partially embedded in the stator 22 in proximity to the periphery of the rotor 20. Surface-mount Hall Effect sensors are placed on the circuit board 14 remote from the rotor magnet 40, and the ferromagnetic elements magnetically link the sensors to the rotor magnet 40, allowing reliable and low-cost sensing of the rotational orientation of the rotor 20. In a first embodiment depicted in FIG. 2, the ferromagnetic elements are embedded in the stator 22 adjacent the radial periphery of the rotor magnet 40. In a second embodiment depicted in FIG. 3, the ferromagnetic elements are embedded in the stator 22 adjacent the axial periphery of the rotor magnet 40.

Figure 2:
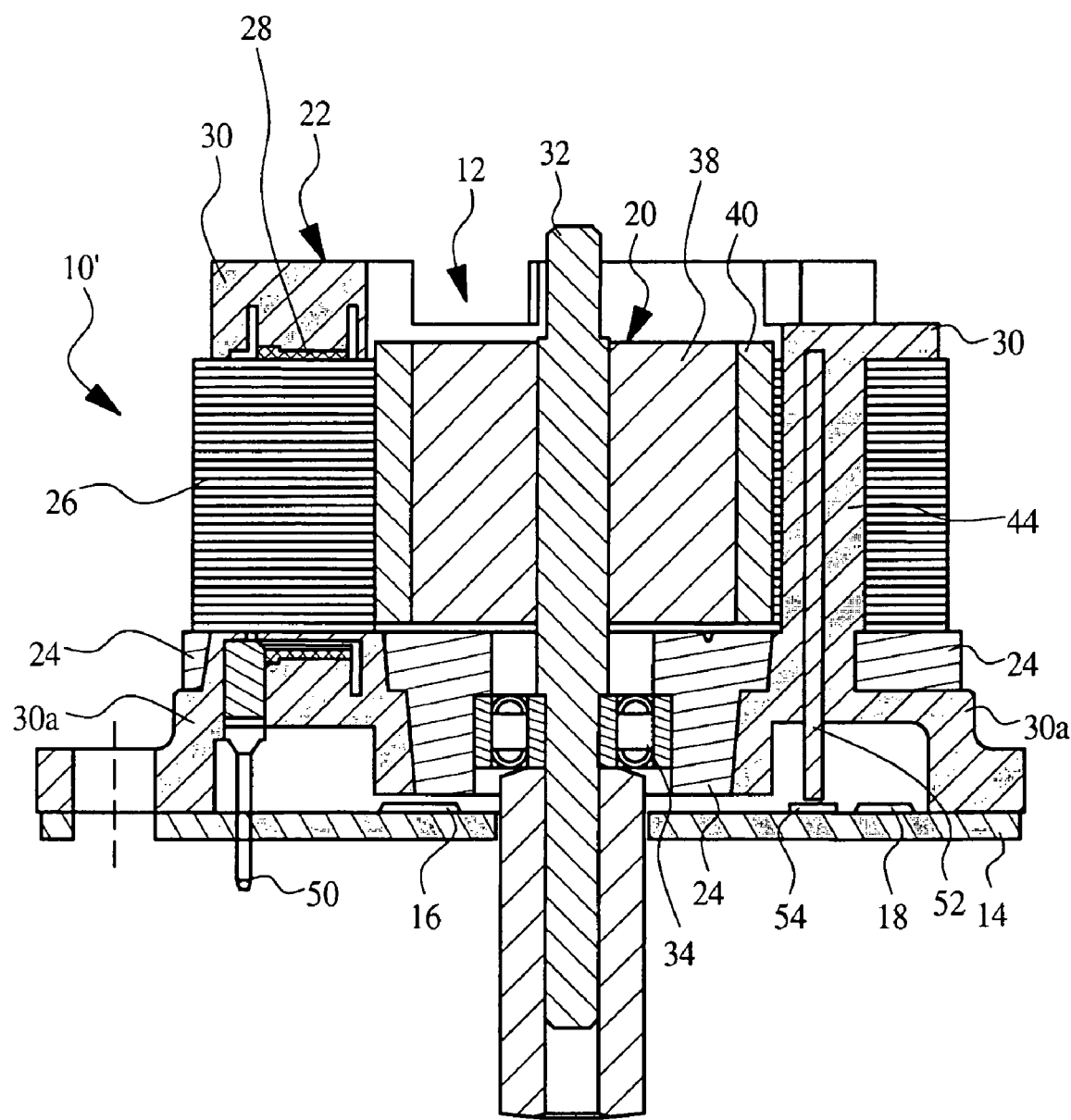
FIG. 2 is a diagram of a rotary actuator comprising a brushless DC motor with a commutation sensing apparatus according to a first embodiment of the present invention.

Referring to FIG. 2, the reference numeral 10' generally designates a rotary actuator with a commutation sensing apparatus according to the first embodiment of this invention. Actuator elements in common with the actuator 10 of FIG. 1 have been assigned the same reference numerals. As in the actuator 10 of FIG. 1, the inner periphery of stator core 26 is undercut at certain radially distributed locations to form plastic-filled regions 44 adjacent the radial periphery of rotor 20. In the actuator 10', elongated axially extending ferromagnetic elements or pins 52 are partially embedded in the plastic-filled regions 44 to direct magnetic flux in the direction of the circuit board 14. Surface mount Hall Effect sensors 54 are mounted on circuit board 14 in axial alignment with the ferromagnetic elements 52, and the elements 52 terminate in close proximity to the respective Hall Effect sensors 54. Essentially, the ferromagnetic elements 52 collect magnetic flux in proximity to the radial periphery of the permanent magnet poles of rotor magnet 40, and direct the flux downward as viewed in FIG. 2 through the surface mounted Hall Effect sensors 54. In the illustrated embodiment, the elements 52 overlap virtually the entire axial length of the rotor magnet 40, but a smaller degree of overlap (i.e., by shortening elements 52) is also possible.

Figure 3:
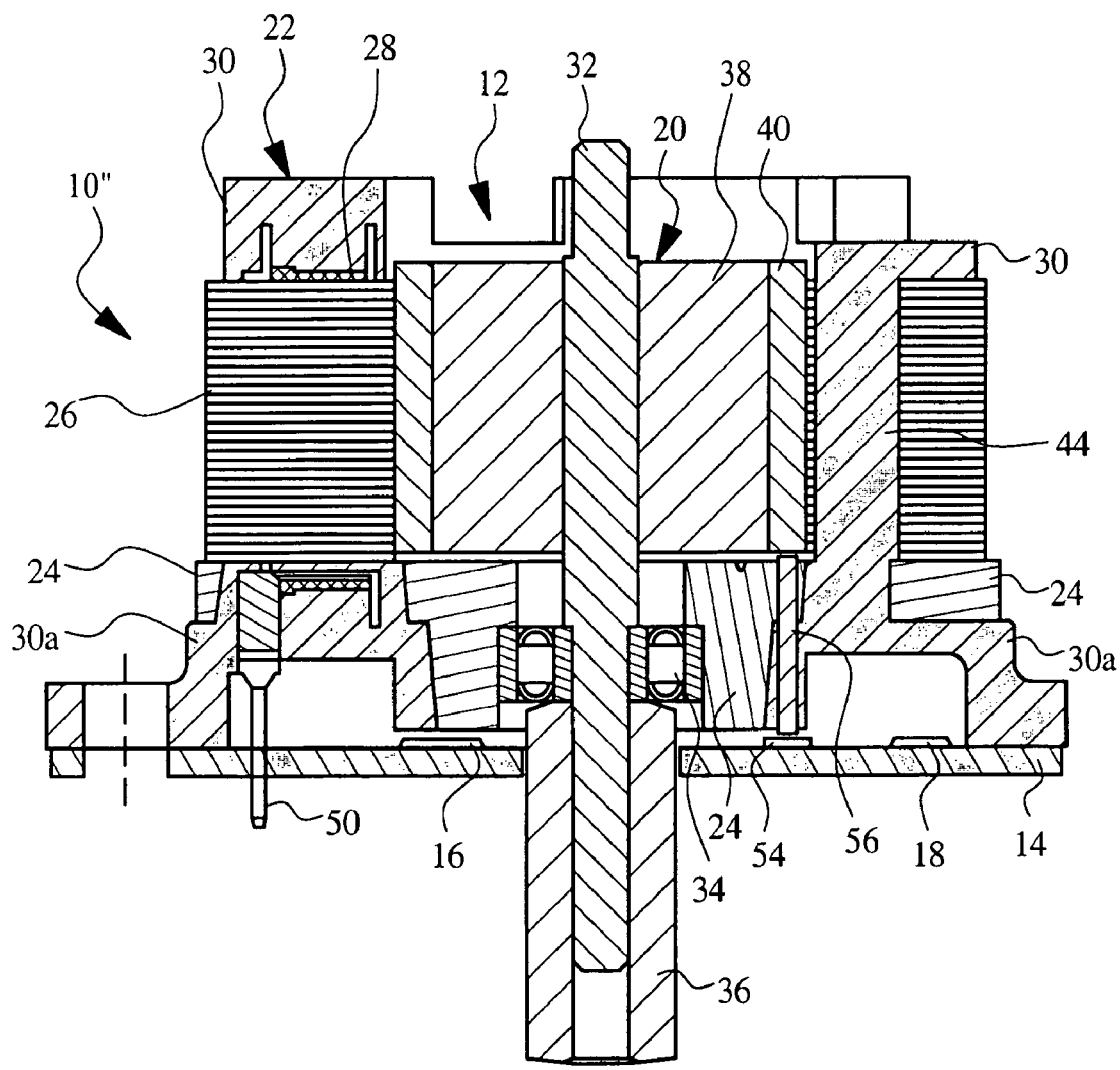
FIG. 3 is a diagram of a rotary actuator comprising a brushless DC motor with a commutation sensing apparatus according to a second embodiment of the present invention.

Referring to FIG. 3, the reference numeral 10" generally designates a rotary actuator with a commutation sensing apparatus according to the second embodiment of this invention. Actuator elements in common with the actuators of FIGS. 1-2 have been assigned the same reference numerals. In this embodiment, elongated axially extending ferromagnetic elements or pins 56 are partially embedded in the aluminum base 24 and over-molded plastic 30, with the inboard end of each element 56 being in proximity to the axial periphery of rotor magnet 40 as shown. The surface mount Hall Effect sensors 54 are mounted on circuit board 14 in axial alignment with the ferromagnetic elements 56, and the elements 56 terminate in close proximity to the respective Hall Effect sensors 54. The ferromagnetic elements 56 collect magnetic flux in proximity to the axial periphery of the permanent magnet poles of rotor magnet 40, and direct the flux downward as viewed in FIG. 3 through the surface mounted Hall Effect sensors 54. Embedding the elements 56 in the base 24 does not affect their flux conduction since aluminum does not conduct magnetic flux.

In summary, the present invention provides a cost effective way of reliably commutating a brushless DC motor. While the invention has been described with respect to the illustrated embodiments, it is recognized that numerous modifications and variations in addition to those mentioned herein will occur to those skilled in the art. For example, the ferromagnetic elements may have a more complex shape than shown, and the motor configuration may be different than shown, even including an inside-out configuration in which the stator core is disposed within a hollow rotor. Accordingly, it is intended that the invention not be limited to the disclosed embodiment, but that it have the full scope permitted by the language of the following claims.

The invention claimed is:

1. A brushless motor actuator, comprising:
   a printed circuit board;
   a Hall Effect sensor surface mounted on said printed circuit board;
   a wound stator assembly affixed to said printed circuit board, including an annular core fixed in a non-magnetic housing and having an axis that is perpendicular to said printed circuit board,
   a rotor supported for rotation about said axis, said rotor having an annular permanent magnet disposed adjacent a radial periphery of said annular core; and
   a ferromagnetic element at least partially embedded in the non-magnetic housing of said wound stator assembly for coupling magnetic flux from the annular permanent magnet of said rotor to said Hall Effect sensor, said ferromagnetic element having a first end disposed in proximity to a periphery of said annular permanent magnet and a second end that terminates in proximity to said Hall Effect sensor,
   where the first end of said ferromagnetic element is disposed in proximity to a radial periphery of said annular permanent magnet, and
   where a radial periphery of said annular core adjacent said annular permanent magnet is undercut to define an axially extending region of non-magnetic housing material in proximity to the radial periphery of said annular permanent magnet, and said ferromagnetic element is at least partially embedded in said axially extending region of non-magnetic housing material.

2. The brushless motor actuator of claim 1, where said ferromagnetic element has a longitudinal axis that is parallel with the axis of said annular core.

3. The brushless motor actuator of claim 1, where said ferromagnetic element extends into said axially extending region of non-magnetic housing material to substantially overlap an axial dimension of said annular permanent magnet.

4. A brushless motor actuator, comprising:
   a printed circuit board;
   a Hall Effect sensor surface mounted on said printed circuit board;
   a sound stator assembly affixed to said printed circuit board, including an annular core fixed in a non-magnetic housing and having an axis that is perpendicular to said printed circuit board,
   a rotor supported for rotation about said axis, said rotor having an annular permanent magnet disposed adjacent a radial periphery of said annular core; and
   a ferromagnetic element at least partially embedded in the non-magnetic housing of said wound stator assembly for coupling magnetic flux from the annular permanent magnet of said rotor to said Hall Effect sensor, said ferromagnetic element having a first end disposed in proximity to a periphery of said annular permanent manget and a second end that terminates in proximity to said Hall Effect sensor,
   where the first end of said ferromagnetic element is disposed in proximity to an axial periphery of said annular permanent magnet; and
   where a periphery of said non-magnetic housing adjacent said annular permanent magnet is undercut to define an axially extending region of non-magnetic housing material in proximity to the axial periphery of said annular permanent magnet, and said ferromagnetic element is at least partially embedded in said axially extending region of non-magnetic housing material.

5. A brushless motor actuator, comprising:
a printed circuit board;
a Hall Effect sensor carried with said printed circuit board;
a wound stator assembly carried with said printed circuit board, including an annular core fixed in a non-magnetic housing and having an axis that is substantially perpendicular to said printed circuit board,
a rotor supported for rotation about said axis, said rotor having an annular permanent magnet disposed adjacent a radial periphery of said annular core; and
a ferromagnetic element at least partially embedded in the non-magnetic housing of said wound stator assembly for coupling magnetic flux from the annular permanent magnet of said rotor to said Hall Effect sensor, said ferromagnetic element having a first portion disposed in proximity to a periphery of said annular permanent magnet and a second portion disposed in proximity to said Hall Effect sensor,
where the first portion of said ferromagnetic element is disposed in proximity to a radial periphery of said annular permanent magnet, and
where a radial periphery of said annular core adjacent said annular permanent magnet is undercut to define an axially extending region of non-magnetic housing material in proximity to the radial periphery of said annular permanent magnet, and said ferromagnetic element is at least partially embedded in said axially extending region of non-magnetic housing material.

* * * * *